United States Patent [19]
Allred

[11] Patent Number: 5,839,468
[45] Date of Patent: Nov. 24, 1998

[54] PUMP VALVE

[75] Inventor: Danny K. Allred, Avant, Okla.

[73] Assignee: Gene Bias, Skiatook, Okla.; a part interest

[21] Appl. No.: 539,850

[22] Filed: Oct. 6, 1995

[51] Int. Cl.⁶ .................................................. F16K 25/00
[52] U.S. Cl. .................................. 137/454.4; 137/543.19; 251/337
[58] Field of Search ........................... 137/454.4, 543.19, 137/543.17, 540; 251/337

[56] References Cited

U.S. PATENT DOCUMENTS

| | | | |
|---|---|---|---|
| 106,974 | 8/1870 | Weinman | 137/454.4 |
| 1,293,284 | 2/1919 | Wolfe | 137/454.4 |
| 2,304,991 | 12/1942 | Foster | 137/454.4 |
| 2,904,065 | 9/1959 | Butlin | 137/454.4 |
| 3,412,931 | 11/1968 | Palmer | 137/454.4 |
| 3,474,808 | 10/1969 | Elliott | 137/454.4 |
| 4,184,814 | 1/1980 | Parker et al. | 137/454.4 |
| 4,667,697 | 5/1987 | Crawford | 137/543.17 |
| 4,674,525 | 6/1987 | Richards et al. | 137/543.17 |
| 4,838,300 | 6/1989 | Seabase | 137/543.19 |
| 4,974,628 | 12/1990 | Tepermeister et al. | 137/454.4 |
| 5,190,072 | 3/1993 | McAnally | 137/454.5 |

*Primary Examiner*—Denise L. Ferensic
*Assistant Examiner*—Joanne Y. Kim
*Attorney, Agent, or Firm*—Scott R. Zingerman; Frank J. Catalano

[57] ABSTRACT

A pump valve for use with positive displacement/reciprocating pumps. The pump valve includes an adapter, valve body, disk, spring, and retaining ring. The adapter is driven or pressed into the fluid end of the pump and includes an annular interior threaded surface to receive a mating threaded neck of the valve body. The valve body includes the neck, trunk having a cavity therein, and an integral valve seat inside the cavity of the trunk. The disk has a diameter slightly smaller than the internal diameter of the cavity so as to fit snugly therein and seat on the integral valve seat of the valve body. The spring is coiled from a first coil of smallest diameter so that each successive coil is of an increased diameter to a final coil of largest diameter. The spring is inserted inside the cavity in the trunk and contacts the disk. The spring is compressed so as to fit entirely within the cavity. A groove is cut in the wall of the trunk on its internal circumference so as to receive a retaining ring. The retaining ring is installed in the groove so that it extends into the wall of the trunk and also extends out into the cavity. The final coil of the spring is only slightly smaller in diameter than the diameter of the cavity so that the spring is retained within the cavity by the retaining ring. The spring thereby biases the disk against the valve seat of the valve body.

6 Claims, 6 Drawing Sheets

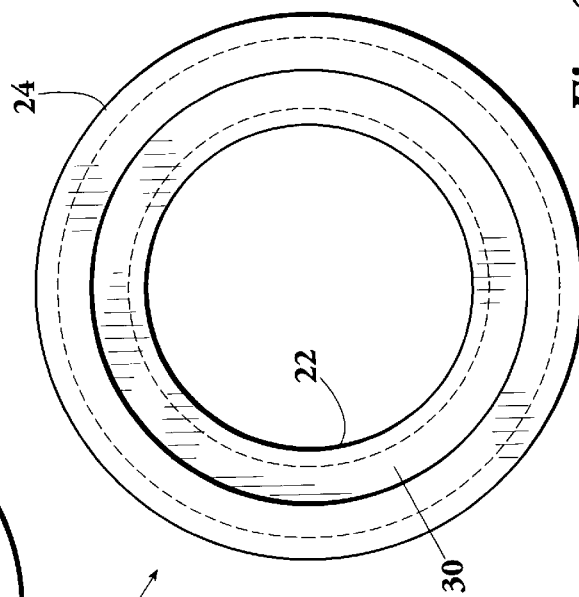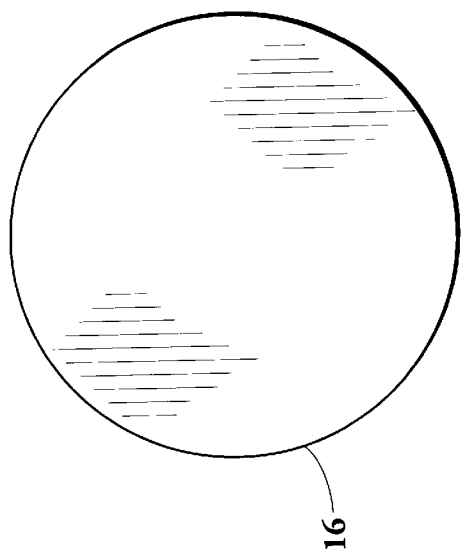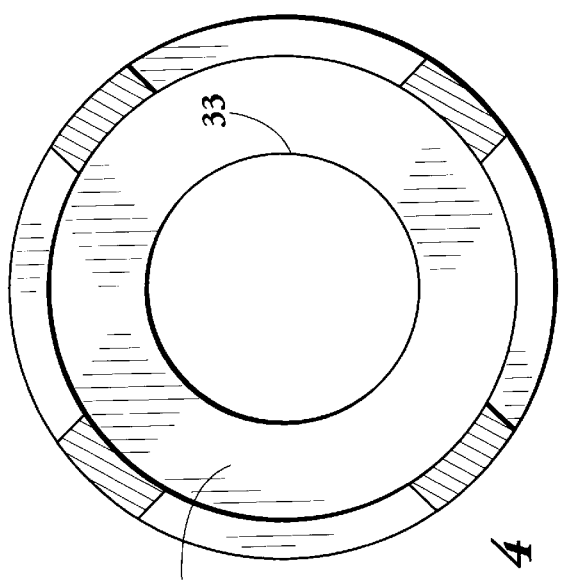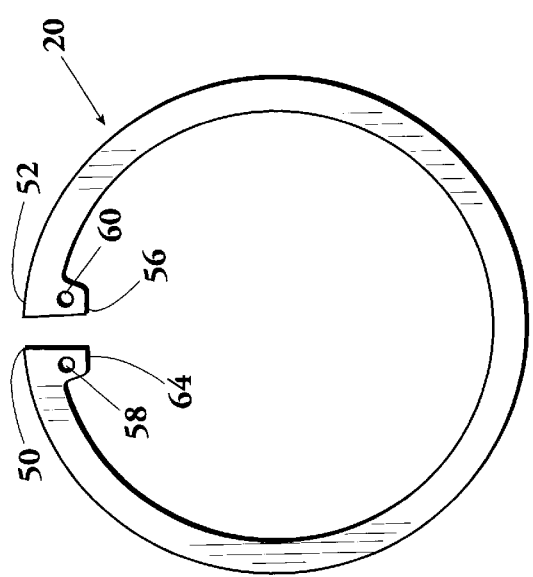

PUMP VALVE

BACKGROUND OF THE INVENTION

1. Description of the Related Art

This invention relates to valves for use in positive displacement, reciprocating pumps.

2. Background of the Invention

Pumps of all types generally require internal valves which alternately open to allow the flow of fluid in one direction and close to prevent backflow of fluid in the opposite direction. Generally these valves operate by alternate fluid and vacuum pressure to open and close. Fluid pressure against the valve in the direction of flow or suction against the valve caused by a reciprocating piston or plunger forces the valve to open while fluid pressure against the valve in a direction opposite the flow, or suction pressure in a direction opposite the flow, forces the valve to seat or close to prevent fluid flow in the opposite direction.

Positive displacement/reciprocating pumps are commonly used for pumping fluids (most commonly water/salt water) in the oil field, mining, and water blasting industries. These reciprocating pumps generally include three chambers in vertical alignment wherein each chamber is separated by a valve. The middle/plunger chamber generally includes a horizontally mounted plunger which reciprocates commonly within a range of 50–500 rpm. On its back cycle, the plunger withdraws from the plunger chamber, thereby causing a pressure drop/suction force which opens the valve separating the lower chamber from the plunger chamber to allow fluid to flow from the lower chamber through the valve and into the plunger chamber. When the plunger extends into the plunger chamber now filled with fluid, a fluid pressure increase occurs in the plunger chamber that closes the valve separating the plunger chamber from the lower chamber and opens the valve separating the plunger chamber from the upper chamber. Fluid then flows from the plunger chamber through the upper valve and into the upper chamber where it exits the pump through an outlet located in the upper chamber. Reciprocating pumps contain at least an upper and lower valve and could have a series of chamber/valve passes aligned horizontally. Such multiple-pass reciprocating pumps are common in the industry.

Pump valves presently available in the industry are annular in cross-section and include a valve seat, plate, spring, and fastener. The valve seat is substantially frusto-conical from a side view and includes a central cylindrical channel therethrough. The top surface of the valve seat includes a retainer including a central threaded opening and a plurality of slots to allow the passage of fluid through the retainer. The plate rests upon the valve seat, and the cooperation between the plate and the valve seat either open to allow fluid to pass through the valve or close to prevent fluid from flowing through the valve. The plate includes a central opening which aligns with the central threaded opening of the retainer. A spring or plurality of cylindrical springs are then placed over the valve plate. Finally, a fastener which is substantially a shield having a bolt extending through its center, secures the components of the valve. The shield covers the cylindrical springs, and the bolt extends through the shield, through the cylindrical spring(s), through the central opening in the plate, and threads into the threaded central opening of the retainer.

Present pump valves for use in reciprocating pumps include a valve seat having a tapered exterior which mates a taper inside the fluid end of the pump where the vertical chambers are separated from one another. Threaded caps are generally provided on the top and front of the fluid end of the pump to allow access to the valve contained therein. On installation, the valve is driven or pressed into the tapered fluid end of the pump at the required location using a mandrel inserted into the fluid end of the pump.

Problems have been encountered with valves of the present invention due to the fact that the plate constantly reciprocating against the valve seat eventually wears either the plate, the valve seat, or the spring. The presence of abrasives or corrosives within the fluid being pumped increases wear on the valve. The valves wear out much sooner than the rest of the pump and require frequent replacement. In order to replace the valve of the present invention, a tool must be inserted inside the fluid end of the pump, and the valve seat must be extracted from its driven position in the fluid end of the pump. This replacement requires significant effort which occasionally causes damage to the pump. A need therefore exists in the industry for a pump valve which can be driven into existing reciprocating pumps yet allow the necessary replacement of the pump valve with little effort and damage to the pump.

Another disadvantage of the pump valves of the present design are that the retainer on the valve seat through which the fastener bolt is threaded must be strong enough to withstand long-term reciprocation of the valve yet allow adequate flow of fluid through it. An additional need therefore exists in the industry for a pump valve design which does not restrict the flow of fluid through the valve.

SUMMARY OF THE INVENTION

This invention includes a novel pump valve design for use with positive displacement/reciprocating pumps. The pump valve of the present invention includes an adapter, valve body, disk, spring, and retaining ring. The adapter includes an annular interior threaded surface, a shoulder, and a substantially smooth annular exterior surface. The exterior surface of the adapter tapers from a greater outer diameter adjacent the shoulder to a reduced outer diameter adjacent its terminal end. The adapter further includes an annular recess to receive a mandrel used for setting the adapter into the fluid end of a pump. The exterior surface of the adapter is tapered to mate a taper in the valve housing into which the adapter is driven or pressed in place.

The valve body of the pump valve of the present invention includes a neck which extends downwardly from a trunk. The neck is threaded to mate the threads of the annular interior threaded surface of the adapter so as to firmly secure the valve body to the adapter. The neck is substantially cylindrical, having an unrestricted, smooth interior surface such that when the neck is threaded into the adapter, fluid flows completely unrestricted through the neck and into the trunk.

The valve body includes an integral valve seat located in the base of the trunk to receive a disk. The cooperation between the valve seat and the disk forms the valve, allowing the flow of fluid through the neck into the trunk but preventing the flow of fluid in the opposite direction. The diameter of the disk is substantially the same as the diameter of the valve seat.

The fact that the valve body threads into the adapter and includes an integral valve seat means that once the adapter is installed in the fluid end of a pump, the valve body can be easily unscrewed from the adapter and replaced as necessary. The moving parts of the pump valve are thus contained entirely within the valve body and are thus easily replaceable by unscrewing the valve body from the adapter and replacing it.

The valve body further includes a plurality of apertures around its circumference to facilitate the flow of fluid through the valve. The apertures are substantially oval in shape.

The trunk of the valve body contains a cavity to receive the disk, spring, and retaining ring. The disk is preferably of solid construction to provide weight and wear durability. The spring is a blank spring and is designed so as to bias the disk against the valve seat in the resting condition of the valve. Upon the application of fluid or suction pressure forces on the disk, the spring compresses, thereby allowing the disk to unseat from the valve seat wherein fluid passes around the disk and out through the apertures in the valve body. The trunk includes a groove cut in its interior circumference to receive a retaining ring. The groove extends into the wall of the trunk around the entire internal circumference of the trunk.

The ring is not continuous but rather includes a first end and a second end, separated by a gap or space therebetween. The first end and second end of the ring each include a tab thereon. The tabs further each have a hole punched therein. The tabs allow a tool to be inserted in the holes punched in them so that the first end and the second end of the retaining ring can be squeezed together, thereby reducing or eliminating the space between the first and second end. Squeezing the first end and the second end towards one another further reduces the diameter of the retaining ring.

The retaining ring is installed into the notch inside the trunk by squeezing the first end and the second end of the second retaining ring toward one another so as to reduce the diameter of the retaining ring enough to allow it to fit within the cavity of the trunk and into the groove. The retaining ring fits completely into the groove and thereby extends partially inside the wall of the trunk.

The spring is coiled from a first coil of smallest diameter with each successive coil rotation increasing in diameter to a final coil of largest diameter. This increasing size coil rotation produces a spring having a frusto-conical appearance. The largest diameter coil is only slightly smaller than the internal diameter of the cavity within the trunk so as to fit snugly therein. The smallest diameter coil of the spring contacts the disk.

Assembly of the pump valve of the present invention is accomplished by threading the neck of the valve body into the interior threaded surface of the adapter. The disk is then inserted inside of the cavity in the trunk of the valve body so that it rests on the valve seat. The spring is then placed within the cavity so that its smallest diameter coil contacts the disk and is then compressed so that it is entirely within the cavity of the trunk underneath the groove. The retaining ring is then installed into the groove so as to retain the spring within the cavity of the valve body. The slightly compressed spring thereby biases the disk against the valve seat.

Two notches are cut in the top surface of the trunk of the valve body. The notches are positioned 180° around the circumference of the upper surface of the trunk so that they are aligned with one another. The notches are cut to receive a mating installation tool so that when the valve adapter is installed in the fluid end of a pump, the installation tool could be inserted inside the fluid end of the pump and engage the notches so that the valve body, containing the disk, the spring, and the retaining ring, can be threaded into the adapter and secured thereto.

The adapter is installed in the housing of a reciprocating pump using a mandrel inserted into the fluid end of the pump. The mandrel rests in the recess of the adapter and is driven downwardly so as to drive or press the adapter into the fluid end of the pump. The shoulder of the adapter prevents the adapter from being installed too far into the fluid end of the pump to prevent the fluid end of the pump cracking. Once installed, the adapter of the present invention may never need to be removed from the fluid end of the pump because it will not likely wear due to the fact that there are no moving parts in contact with the adapter. Once installed, a valve body containing the disk, spring, and retaining ring is then threaded into the adapter, and the valve is ready for use. In the event that the pump valve needs replacement due to wear, the valve body is simply unscrewed from the adapter, and a new or rebuilt pump valve, containing the disk, spring, and retaining ring, is again threaded into the adapter.

The pump valve of the present invention thereby provides ease of installation and replacement.

An alternate embodiment of the pump valve of the present invention also includes an adapter, valve body, spring, and retaining ring. As with the preferred embodiment, the alternate embodiment valve body includes an integral valve seat. The disk of the alternate embodiment, however, is modified to include an integral wing guided portion that extends into the neck of the valve body. Wing guided pump valves are preferred for certain applications. The valve body of the alternate embodiment is substantially the same as the valve body of the preferred embodiment with the exception that the valve seat is modified to include a taper that mates a tapered portion of the disk. The disk thereby seats into the valve body by seating its tapered portion into the mating tapered portion of the valve body. A dovetail groove is cut in the circumference of the disk to receive an O-ring. The O-ring assists in ensuring a proper seal between the disk and the valve body. The adapter, spring, and retaining ring are identical in the alternate embodiment to the adapter, spring, and retaining ring of the preferred embodiment. Because the valve body of the alternate embodiment includes an integral valve seat, the alternate embodiment pump valve is installed, operates, and is replaced in the same manner as the pump valve of the preferred embodiment.

An object of the present invention, therefore, is to provide a pump valve including a valve body having an integral valve seat which is easily removable from the valve adapter for repair or replacement. The valve adapter is not for the purpose of being a valve seat and, therefore, does not wear out.

A further object of the present invention is to provide a greater flow rate of fluid through the valve due to the fact that there is no center restriction in the valve adapter/valve body relationship.

A yet further object of the pump valve of the present invention is to provide a pump valve which allows easy, rapid installation and removal that prevents damage to the pump.

These and other objects will become more apparent from the following description taken in conjunction with the drawings.

BRIEF DESCRIPTION OF THE DRAWINGS

FIG. 3 is a top view taken along line 3—3 of FIG. 2 of the valve adapter of the pump valve of FIG. 1.

FIG. 4 is a top view taken along the line 4—4 of FIG. 2 of the valve body including integral seat of the pump valve of FIG. 1.

FIG. 5 is a top view taken along the line 5—5 of FIG. 2 of the disk of the pump valve of FIG. 1.

FIG. 6 is a top view taken along the line 6—6 of FIG. 2 of the retaining ring of the pump valve of FIG. 1.

DETAILED DESCRIPTION OF THE PREFERRED EMBODIMENT

Figure 1:
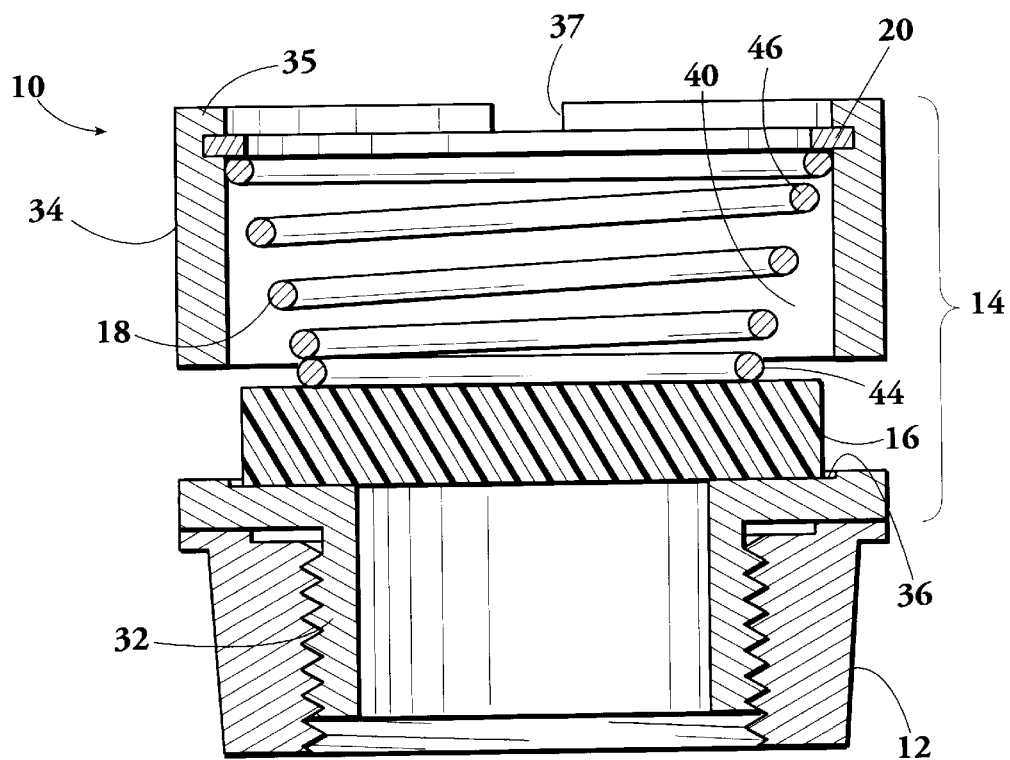
FIG. 1 is a vertical cross-section of the pump valve of the present invention.

Referring to FIG. 1, pump valve 10 includes adapter 12, valve body 14, disk 16, spring 18, and retaining ring 20.

Figure 2:
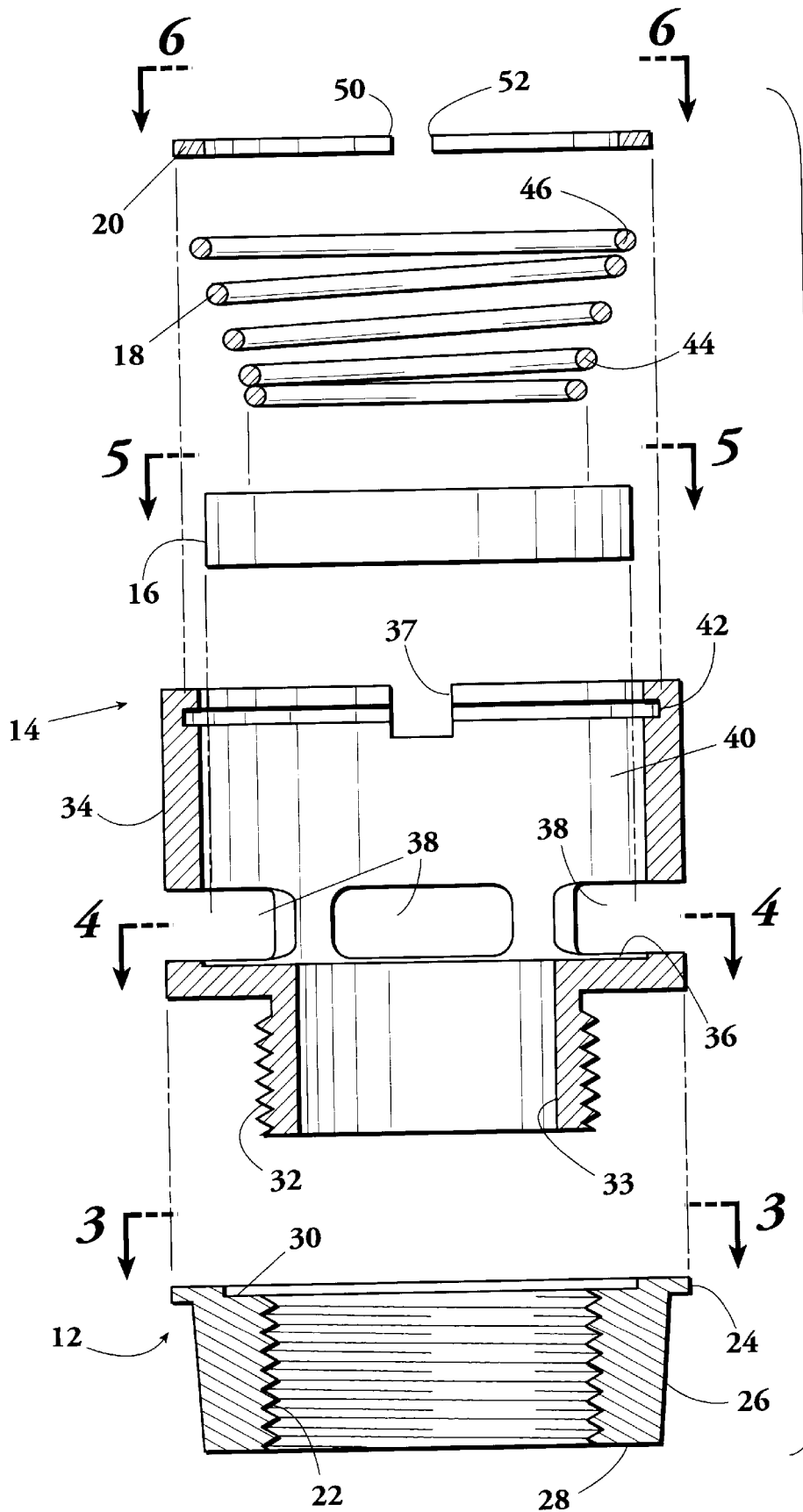
FIG. 2 is a side partial cut-away exploded view of the pump valve of FIG. 1.

FIG. 2 is the pump valve of FIG. 1 shown in a partial cut-away exploded view. Adapter 12 includes an annular interior threaded surface 22, a shoulder 24, and a substantially smooth annular exterior surface 26. Exterior surface 26 tapers from a greatest outer diameter adjacent shoulder 24 to a reduced outer diameter adjacent terminal end 28 of adapter 12. Adapter 12 further includes an annular recess 30 to receive a mandrel (as described further below) used for setting adapter 12 into the fluid end of a pump. The exterior surface 26 of adapter 12 is tapered to allow adapter 12 to be driven, or pressed, into place within the fluid end of a pump. Once adapter is driven, or pressed, into the fluid end of a pump, it is very difficult to replace it, requiring specialized tools.

Referring to FIG. 3, a top view of adapter 24, it can be seen that adapter 12, including interior surface 22, shoulder 24, and recess 30, are annular in geometric shape. However, it is understood that adapter 12 could be configured in other suitable shapes as may be required for specific pump applications without departing from the scope of this invention.

Referring back to FIG. 2, valve body 16 includes a neck 32 extending downwardly from a trunk 34. Neck 32 is threaded to mate the threads of annular interior threaded surface 22 of adapter 12 and is of a sufficient length so that when neck 32 is threaded into the interior threaded surface 22 of adapter 12 (as in FIG. 1) and adapter 12 is pressed into the fluid end of a pump (as in FIG. 9), valve body 14 is firmly secured to adapter 12. Neck 32 is substantially cylindrical having an unrestricted, smooth interior surface such that when neck 32 is threaded into adapter 12, fluid flows completely unrestricted through neck 32.

Valve body 14 includes an integral valve seat 36 located at the base of trunk 34 to receive disk 16. The cooperation between valve seat 36 and disk 16 forms a valve allowing the flow of fluid through neck 32 into trunk 34 but preventing the flow of fluid in the opposite direction. Valve seat 36 can be seen from a top view in FIG. 4. Disk 16 of FIG. 5 is of an outer diameter which is substantially the same as the diameter of seat 36 of FIG. 4 such that there is a secure fit between disk 16 and seat 36. Disk 16 is shown seated in seat 36 of valve body 14 of FIG. 1. In this position, disk 16 prevents the flow of fluid through neck 32 and into trunk 34.

The fact that valve body 14 threads into adapter 12 and includes integral valve seat 36 means that once adapter 12 is installed in a pump, valve body 14 can be easily unscrewed from adapter 12 and replaced. The moving parts of pump valve 10 are contained within valve body 14 which is easily replaceable as compared to adapter 12.

However, when disk 16 is separated from seat 36, fluid flows unrestricted through neck 32 around disk 16, the flow of fluid being restricted only by the internal diameter 33 of neck 32 in FIG. 4. This diameter can be varied as required according to each specific valve application.

Referring again to FIG. 2, valve body 14 includes a plurality of apertures, collectively 38, to facilitate the flow of fluid through the valve. Apertures 38 are substantially oval shaped in the preferred embodiment, however, it is understood that other shapes are equally suitable.

Disk 16 is preferably of solid construction to provide weight and wear durability. It has been found that suitable materials for the construction of disk 16 include: Delrin® or stainless steel; however, other materials may be equally suitable. Stainless steel has been found most suitable where disk 16 is used under abrasive conditions such as where abrasive particles are suspended in the fluid passed through the valve. When disk 16 is stainless steel, it may include a groove containing an O-ring (not shown) to provide a proper seal with valve seat 36.

Trunk 34 of valve body 14 contains a cavity 40 to receive disk 16 and a spring 18. Spring 18 is a coil spring so as to bias disk 16 against seat 36 in the resting condition. Upon the application of fluid or suction pressure forces on disk 16, spring 18 compresses thereby, unseating disk 16 from seat 36, allowing fluid to pass around disk 16 and out through apertures 38. Spring 18 is preferably constructed of inconal; however, other materials are equally suitable.

Trunk 34 also includes a groove or notch 42 to receive retaining ring 20. Groove 42 extends into the wall of trunk 34 around the internal circumference of trunk 34.

Referring next to FIG. 6, retaining ring 20 is not a continuous ring but rather includes a first end 50 and a second end 52 separated by a gap or space therebetween. First end 50 and second end 52 of ring 20 each have a tab 54 and 56 respectively thereon. Tabs 54 and 56 each have a hole 58 and 60 respectively punched therein. Tabs 54 and 56 allow a tool to be inserted in hole 58 and 60 so that first end 50 and second end 52 can be squeezed together, thereby reducing or eliminating the space therebetween. Squeezing first end 50 and second end 52 toward one another reduces the diameter of retaining ring 20.

Retaining ring 20 is installed into notch 42 of valve body 14 by squeezing first end 50 and second end 52 of retaining ring 20 toward one another so as to reduce the diameter of retaining ring 20 enough to allow retaining ring 20 to fit within cavity 40 and into groove 42. Once retaining ring 20 is fit into groove 42, the pressure squeezing first end 50 and second end 52 toward one another is released, thereby allowing retaining ring 20 to return to its original larger diameter. Retaining ring 20 thereby fits completely into the interior circumference of groove 42 such that retaining ring 20 extends partially inside the wall of trunk 34.

Spring 18 is coiled so that each coil rotation increases from a smallest diameter coil 44 to a largest diameter coil 46. This increasing size coil rotation produces a spring having a frusto-conical appearance from a side view (FIGS. 1 and 2).

As spring 18 is compressed within trunk 34 by the fluid or suction pressure forces removing disk 16 from seat 36 in the direction of retaining ring 20, the frusto-conical shape of spring 18 allows smaller diameter coil 44, and subsequently, the increasingly larger diameter coils between smallest diameter coil 44 and largest diameter coil 46, to compress within largest diameter coil 46. This telescoping effect is so that in its compressed position, spring 18 takes up a minimum of space within cavity 40 in order that disk 16 can be forced within cavity 40 so as to allow the maximum flow of fluid through neck 32 of valve body 14.

The largest diameter coil 46 is only slightly smaller than the internal diameter of cavity 40 so as to fit snugly therein as is shown in FIG. 1. The smallest diameter coil 44 of spring 18 contacts disk 16.

Referring back to FIG. 2, assembly of the pump valve of the present invention is accomplished by threading neck 32 of valve body 14 into the annular interior threaded surface 22 of adapter 12. Disk 16 is then inserted inside cavity 40 of valve body 14 so that it rests on seat 36. Spring 18 is then placed within cavity 40 such that the smallest diameter coil 44 contacts disk 16 on the surface of disk 16 opposite the surface in which disk 16 contacts seat 36. Spring 18 is then compressed so that it is entirely inside cavity 40 underneath groove 42. Retaining ring 20 is then installed into groove 42 as described above so as to retain spring 18 within cavity 40 of valve body 14. Spring 18 is slightly compressed, thereby biasing disk 16 against seat 36. FIG. 1 depicts the manner in which spring 18 is retained within cavity 40 by retaining ring 20 and thereby biasing disk 16 against seat 36. FIG. 1 is a vertical cross-section so that apertures 38 in valve body 14 are not shown.

Figure 7:
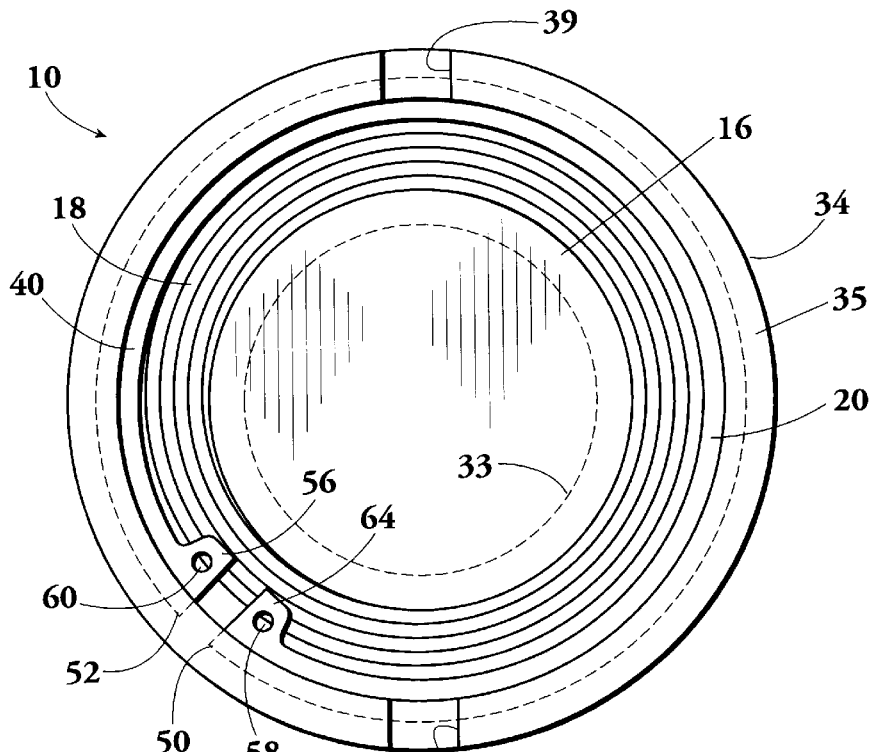
FIG. 7 is a top view of the assembled pump valve of FIG. 1.

FIG. 7 is a top view of pump valve 10 of FIG. 1. FIG. 7 depicts retaining ring 20 extending within the wall of trunk 34 (shown in phantom). FIG. 7 further shows retaining ring 20 retaining spring 18 within cavity 40 and in contact with disk 16. The internal diameter 33 of neck 32 is shown in phantom.

As can be seen in FIG. 1 from a side view and FIG. 7 from a top view, the top surface 35 of valve body 14 includes notches 37 and 39 in its circumference. In FIG. 7, notch 39 is aligned with notch 37 and positioned 1800 around the circumference of upper surface 35. Notches 37 and 39 are angled (as shown in FIG. 2) so as to receive a mating installation tool such that when valve adapter 12 is installed in the fluid end of a pump (FIGS. 8, 9), the installation tool could be inserted in notches 37 and 39 so that valve body 14, including disk 16, spring 18, and retaining ring 20, can be threaded into adapter 12 to be secured thereto. Notches 37 and 39 could be configured within alternate geometries to mate an installation tool.

Figure 8:
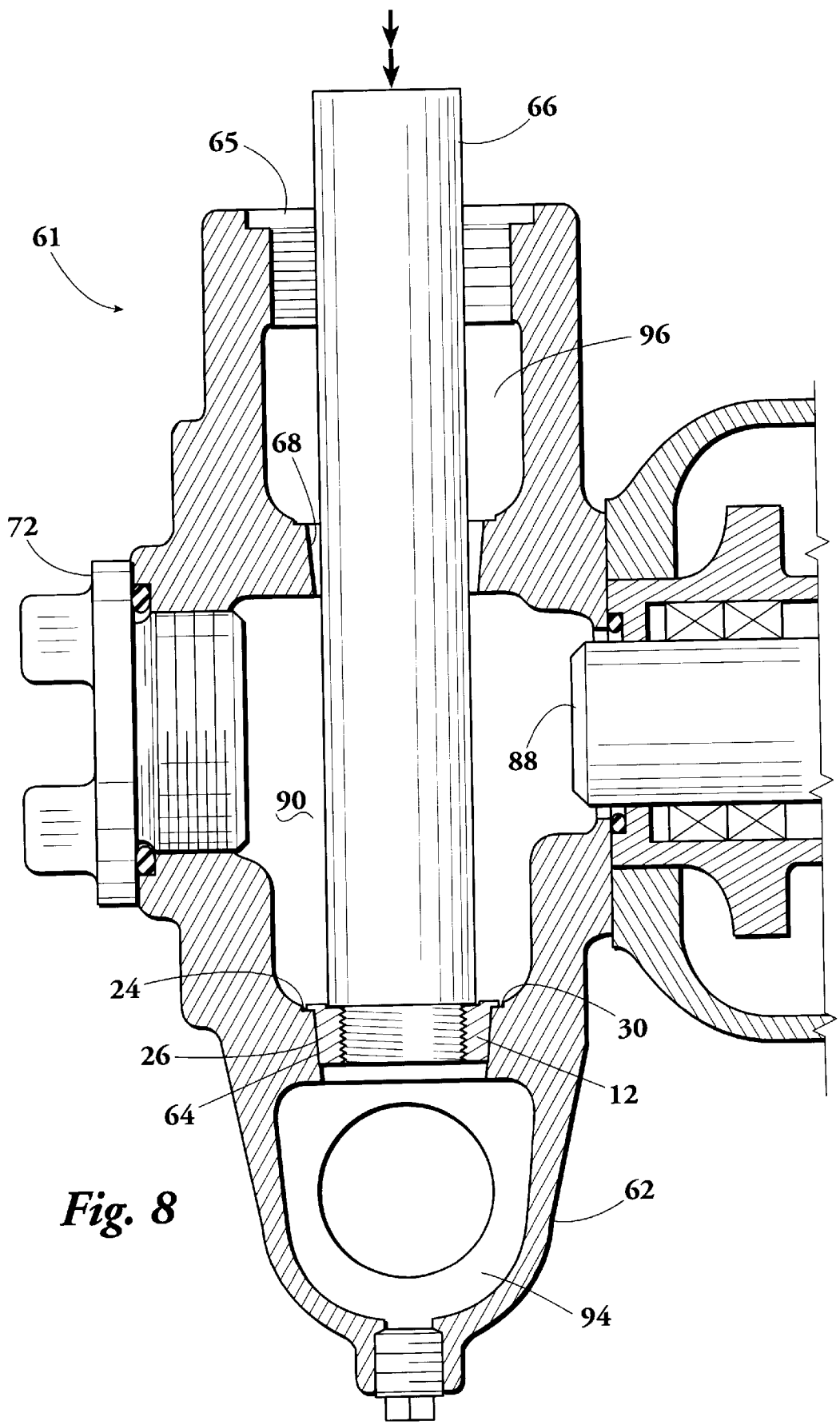
FIG. 8 is a partial vertical cross-section of a reciprocating pump depicting a valve adapter of the present invention being installed using a mandrel.

Referring to FIG. 8, adapter 12 is shown during installation into the fluid end of the pump 62. The interior surface 64 of the fluid end of the pump 62, where adapter 12 is installed, is tapered to mate the taper of exterior surface 26 of adapter 12.

Figure 9:
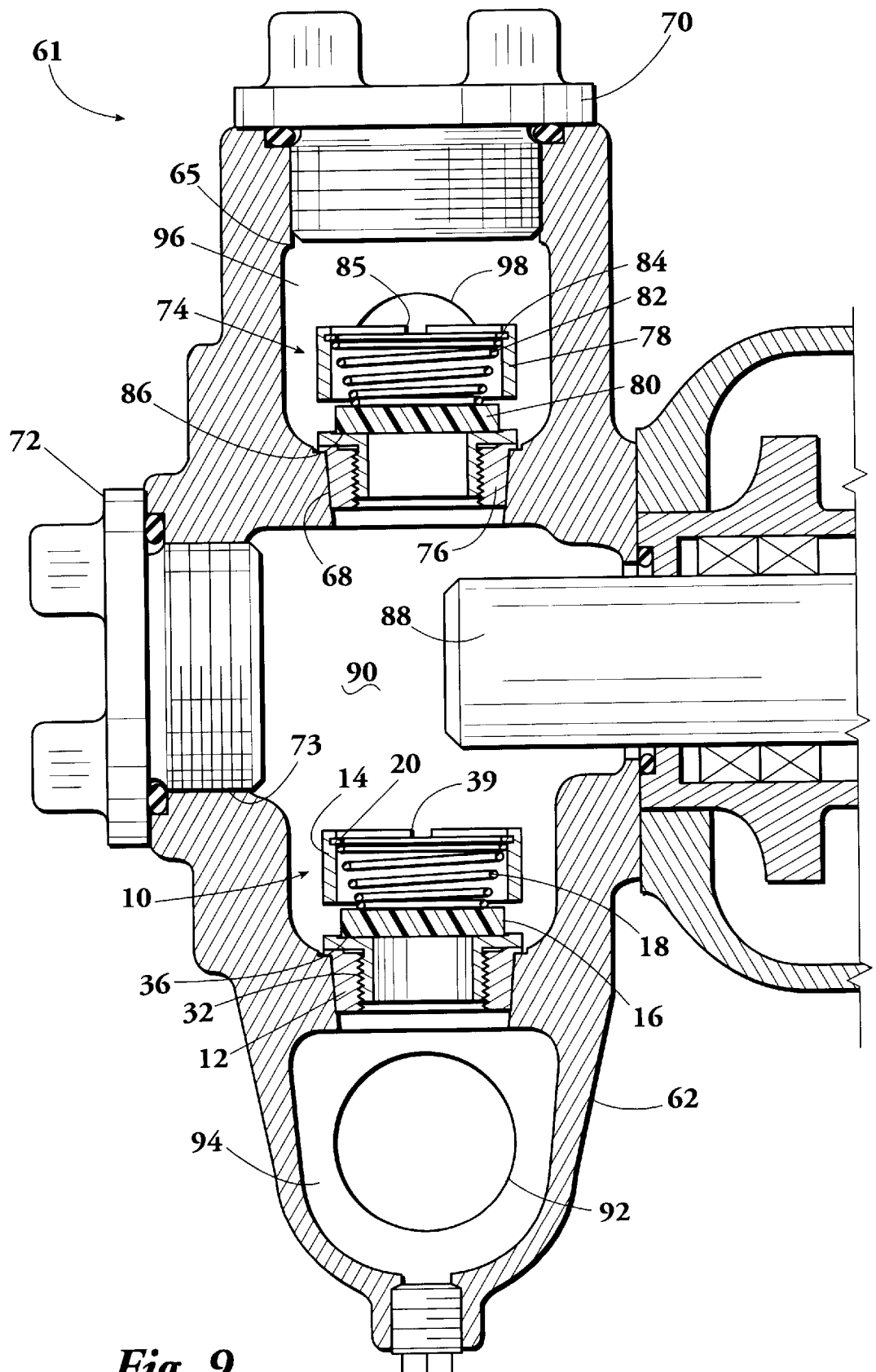
FIG. 9 is a partial vertical cross-section view of a portion of a reciprocating pump depicting two pump valves of the present invention shown in cross-section as installed in the fluid end of the pump.

Adapter 12 is inserted through top opening 65 in the fluid end of the pump 62 to the proper installation location between lower chamber 94 and plunger chamber 90. A mandrel 66 is then inserted into the fluid end of the pump 62 and rests in recess 30 of adapter 12. Mandrel 66 then is driven downwardly onto adapter 12, thereby driving, or pressing, adapter 12 into housing 62. Shoulder 24 of adapter 12 is of a greater diameter than the interior of housing 62 so as to stop adapter 12 from being inserted too far into housing 62. Adapter 12 is now installed in the fluid end of the pump 62. Adapter 12 of the present invention may never need to be removed from the fluid end of the pump 62 because there are no parts of pump valve 10 in moving contact with adapter 12. Likewise, the installation procedure is repeated to install an upper valve in housing 62 at position 68 between plunger chamber 90 and upper chamber 96. FIG. 9 depicts pump valve 10 of the present invention installed inside the fluid end of the pump 62. Once adapter 12 is pressed into the fluid end of the pump 62, valve body 14, including disc 16, spring 18, and retaining ring 20 is threaded into adapter 12. Pump valve 10 is now installed inside the fluid end of the pump 62.

As stated above, since there are no moving parts in contact with adapter 12, adapter 12 will rarely, if ever, need to be replaced. Since valve body 14 includes an internal valve seat upon which disc 16 rests, it may only be necessary to replace valve body 14, including disk 16, spring 18, and retaining ring 20.

FIG. 9 depicts a second pump valve 74 installed within the fluid end of the pump 62. Pump valve 74 is identical to pump valve 10 positioned at an upper position 68 between plunger chamber 90 and upper chamber 96. Pump valve 74 includes adapter 76, valve body 78, disk 80, spring 82, and retaining ring 84. As with pump valve 10, pump valve 74 includes valve body 78 having an integral valve seat 86 against which disk 80 is biased by spring 82 retained within valve body 78. Pump valve 74 is installed in the fluid end of the pump 62 at position 68 through top cap 70 in the same manner in which valve pump 10 is installed. As with pump valve 10, valve body 78 of pump valve 74 can be removed from adapter 76 and replaced through top cap 70 as required.

In the event that both pump valve 10 and pump valve 74 need replacement, top cap 70 of the fluid end of the pump 62 is removed, and valve body 78 is unscrewed from adapter 76 and removed through the top opening 65 in the fluid end of the pump 62. In order to replace pump valve 10, side cap 72 is removed from the fluid end 62 of the pump 61 and valve body 14 is unscrewed from adapter 12 and removed through side hole 73 of the fluid end of pump 62. Plunger 88 located within plunger chamber 90 should be retracted (as shown in FIG. 8) so as to allow access to pump valve 10. Once valve body 78 and valve body 14 of pump valves 74 and 10 have been removed from the fluid end of the pump 62 for replacement, new or rebuilt valve body is then inserted into plunger chamber 90 through side opening 73 and placed onto adapter 12. A setting tool can then be installed through top opening 65 through adapter 76 and into notch 39 so as to thread the replacement valve body into adapter 12. Once the replacement valve body is installed into adapter 12, side cap 72 is reinserted. A replacement for valve body 78 is then installed through top opening 65 and placed into adapter 76. The setting tool is then inserted through top openings 65 once again into notch 85 so as to thread the replacement upper valve body into adapter 76. Once worn valve bodies 14 and 78 are replaced, top cap 70 is then reinstalled into top opening 65, and pump 61 is once again ready for operation.

In operation, the path of fluid through pump 61 is through an inlet 92 in lower chamber 94 through pump valve 10 into a plunger chamber 90 where it is pumped by plunger 88 through pump valve 74 into an upper chamber 96 and exits an outlet 98 located in upper chamber 96 (partially obscured in FIG. 9). Fluid is pumped through pump 61 by intermittent suction and fluid flow pressure forces caused by reciprocation of plunger 88 within plunger chamber 90. When plunger 88 is retracted in plunger chamber 90 (as shown in FIG. 8), a partial vacuum or pressure drop is caused within plunger chamber 90. The pressure drop within plunger chamber 90 causes suction within plunger chamber 90 forcing disk 80 in pump valve 74 to seat in valve body 78, closing fluid communication between plunger chamber 90 and upper chamber 96. The suction within plunger chamber 90 simultaneously pulls disk 16 (having a large surface area) of pump valve 10 against spring 18 within valve body 14 so that fluid located in lower chamber 94 is sucked through neck 32 of valve body 14 around disk 16, thereby filling plunger chamber 90 with fluid. Once plunger chamber 90 is filled, plunger 88 is then extended into plunger chamber 90, causing an increase in pressure in the fluid located within plunger chamber 90. This increased fluid pressure replaces the suction force on disk 16 and alternatively forces disk 16 onto valve seat 36 of valve body 14, closing fluid communication between lower chamber 94 and plunger chamber 90. This over pressure situation caused by plunger 88 causes fluid pressure to be exerted upon disk 80 of pump valve 94, biasing it against spring 82 and allowing fluid to flow through valve body 78 around disk 80, into upper chamber 96. Fluid then exits through outlet 98.

This cycle of repeated suction and pressure conditions within pump 61 caused by the reciprocation of plunger 88 within plunger chamber 90 typically occurs 50–500 rpm. Thus disks 16 and 80 seat and unseat against seats 36 and 86 of valves 10 and 74, respectively, 50–500 rpm. Over a period of time, disks 16 or 80, valve seats 36 or 86, or springs 18 or 82 may wear out. The presence of abrasives or corrosives within the fluid may cause increased wear. Over time, valve body 14 or 78 may need to be replaced.

Figure 10:
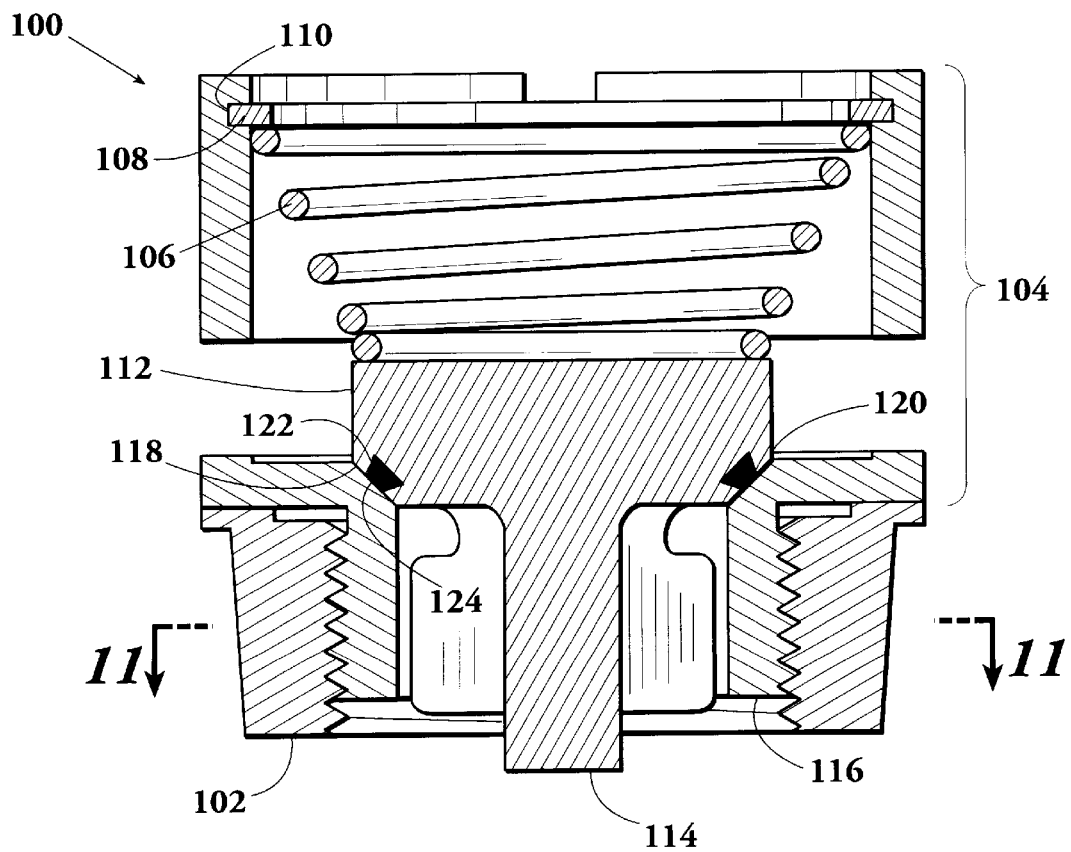
FIG. 10 is a vertical cross-section of an alternate embodiment of the pump valve of the present invention wherein the disk of FIG. 1 is wing guided and includes an O-ring.

FIG. 10 shows an alternate embodiment of the pump valve of the present invention. Pump valve 100 includes adapter 102, valve body 104, spring 106, and retaining ring 108. Retaining ring 108 is installed in groove 110 cut in the wall of valve body 104. Disk 16 (FIG. 1) is modified in FIG. 10. Disk 112 of FIG. 10 includes an integral wing guided portion 114 that extends into neck 116 of valve body 104. Valve body 104 is substantially the same as valve body 14 of FIG. 1 with the exception that valve seat 36 of FIG. 1 has been modified. In FIG. 10, valve seat 118 is tapered in order to receive a mating tapered portion 120 of disk 1 14. Disk 112 thereby seats into valve body 104 by seating its tapered portion 120 onto the mating tapered portion 118 of valve body 104. A dovetail groove 122 is cut in the circumference of disk 112 to receive an O-ring 124. O-ring 124 assists in ensuring a proper seal between disk 112 and valve body 104.

In the alternate embodiment, disk 112 will preferably be constructed of stainless steel; however, it is understood that other materials could be suitably substituted.

Figure 11:
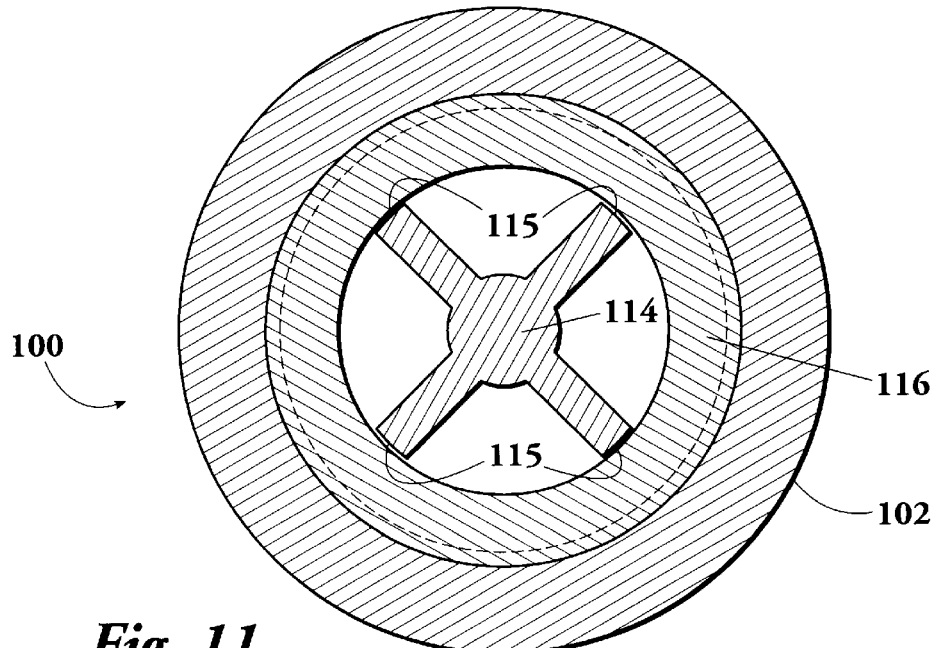
FIG. 11 is a bottom view of the alternate embodiment depicted in FIG. 10 taken along line 11—11 of FIG. 10.

FIG. 11 is a view taken along line 11—11 of FIG. 10 showing in cross-section the relationship between wing guided portion 114 including wings, collectively 115, and neck 116. It can be seen that substantial space exists inside neck 116 around wings 115 and wing guided portion 1 14 to allow fluid to freely pass therethrough.

Because valve body 104 also includes an integral valve seat, alternate embodiment pump valve 100 is installed, operates, and is replaced in the same manner as pump valve 10 of FIGS. 1–9. Adapter 102, spring 106, and retaining ring 108 of FIG. 10 are identical to adapter 12, spring 118, and retaining ring 20 of FIGS. 1–9. Likewise, pump valve 100 of FIG. 10 is assembled in the same manner as pump valve 10 of FIG. 1.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A valve for use with a pump having a pump housing comprising:

an adapter of a character to be press fitted in said pump housing, said adapter having a longitudinal passage therethrough and an interior threaded surface in said adapter; an inlet end and an outlet end, said inlet end being adjacent the pump housing;

a valve body including a valve seat;

means for releasably attaching said valve body to said adapter including a neck on said valve body, said neck including threads which mate the threads of said interior surface of said adapter and wherein said valve seat is located exterior of said adapter and at the outlet end;

a disk positioned adjacent said valve seat;

a spring positioned adjacent said disk;

means for securing said disk and said spring to said valve body.

2. The pump valve of claim 1 wherein said means for securing said disk and said spring to said valve body includes:

inserting said disk and said spring into a cavity located inside said valve body;

means for retaining said disk and said spring in said cavity.

3. The pump valve of claim 2 wherein said means for retaining said disk and said spring in said cavity include at least partially inserting a retaining ring into a groove cut into the wall of said valve body in said cavity.

4. The pump valve of claim 3 wherein said retaining ring includes:

a first end and a second end;

said first end and said second end each including a tab containing a hole punched therein.

5. A pump attachment for attachment in a pump for use in pumping liquids comprising:

a pump housing in said pump;

an adapter press fitted into the pump housing of said pump;

said adapter having a threaded passage therethrough from the inlet end closest to the outlet end;

a threaded valve body including a valve seat, said valve body connectable into the threads of said adapter, said valve body having a seat outside the outlet end of said adapter;

disk means for reciprocating movement in contact with and displaced from said valve seat;

spring means from biasing said disk means toward said valve seat;

means for securing said disk means and said spring means in said valve body;

said valve means and said adapter being such that said valve body can be readily disconnected from said adapter by simply unscrewing the valve means from the adapter and the valve seat can be removed from said adapter and readily replaced while said adapter remains firmly pressed into said pump housing.

6. A valve for use with a pump having a pump housing comprising:

an adapter of a character to be press fitted in said pump housing, said adapter having a longitudinal passage therethrough; an inlet end and an outlet end, said inlet end being adjacent the pump housing;

a valve body including a valve seat and a neck, said neck including threads which mate with the threads of said interior surface of said adapter whereby said valve body is capable of being unscrewed and separated from said adapter while said adapter is maintained in its pressed fit within said pump housing;

a disk positioned adjacent said valve seat;

a spring positioned adjacent said disk;

means for securing said disk and said spring to said valve body.

* * * * *